(12) United States Patent
Koh

(10) Patent No.: US 12,161,133 B1
(45) Date of Patent: Dec. 10, 2024

(54) MANUFACTURING METHOD OF COFFEE BEAN COMPRESSION BLOCK

(71) Applicant: John H. Koh, Goyang-si (KR)

(72) Inventor: John H. Koh, Goyang-si (KR)

( * ) Notice: Subject to any disclaimer, the term of this patent is extended or adjusted under 35 U.S.C. 154(b) by 0 days.

(21) Appl. No.: 18/586,261

(22) Filed: Feb. 23, 2024

(51) Int. Cl.
A23F 5/12 (2006.01)
A23F 5/02 (2006.01)

(52) U.S. Cl.
CPC ............... *A23F 5/125* (2013.01); *A23F 5/02* (2013.01)

(58) Field of Classification Search
CPC .................................. A23F 5/02; A23F 5/125
See application file for complete search history.

(56) References Cited

U.S. PATENT DOCUMENTS

| | | | | |
|---|---|---|---|---|
| 1,535,233 | A * | 4/1925 | Mccoll | A23F 5/125 426/594 |
| 2,371,093 | A * | 3/1945 | Willison | A23F 5/125 426/454 |
| 5,076,157 | A * | 12/1991 | Satake | A23F 5/02 99/626 |
| 2007/0003683 | A1* | 1/2007 | Inoue | A23F 5/486 426/594 |
| 2009/0104309 | A1* | 4/2009 | Nakajima | A23F 5/02 426/507 |
| 2011/0305792 | A1* | 12/2011 | Vella | A23F 5/08 426/2 |
| 2021/0393728 | A1* | 12/2021 | Vella | A61K 31/198 |

FOREIGN PATENT DOCUMENTS

| | | | |
|---|---|---|---|
| GB | 2394164 | * | 4/2004 |
| JP | 2005000159 | * | 1/2005 |
| KR | 20210102505 | * | 8/2021 |
| WO | WO2019004658 | * | 1/2019 |
| WO | WO2020116863 | * | 6/2020 |

OTHER PUBLICATIONS

English translation for KR20210102505 published Aug. 20, 2021.*
English Translation for WO2020116863 published Jun. 11, 2020.*
English Translation for WO2019004658 published Jan. 3, 2019.*
English Translation for JP2005000159 published Jan. 6, 2005.*

* cited by examiner

*Primary Examiner* — Anthony J Weier

(74) *Attorney, Agent, or Firm* — Birch, Stewart, Kolasch & Birch, LLP

(57) ABSTRACT

Discussed is a method of manufacturing a coffee bean block that includes milling a green coffee bean to remove an outer surface of the green coffee bean to obtain a milled green coffee bean; roasting the milled green coffee bean to obtain a roasted milled coffee bean; placing the roasted milled coffee bean into a forming mold; compressing the roasted milled coffee bean in the forming mold using a pushing rod having a protrusion of a predetermined pattern so that the roasted milled coffee bean is crushed into fragments by the forming mold and the pushing rod; and continue compressing the fragments of the roasted milled coffee bean until the fragments are formed into a compressed coffee block.

26 Claims, 9 Drawing Sheets

10

20

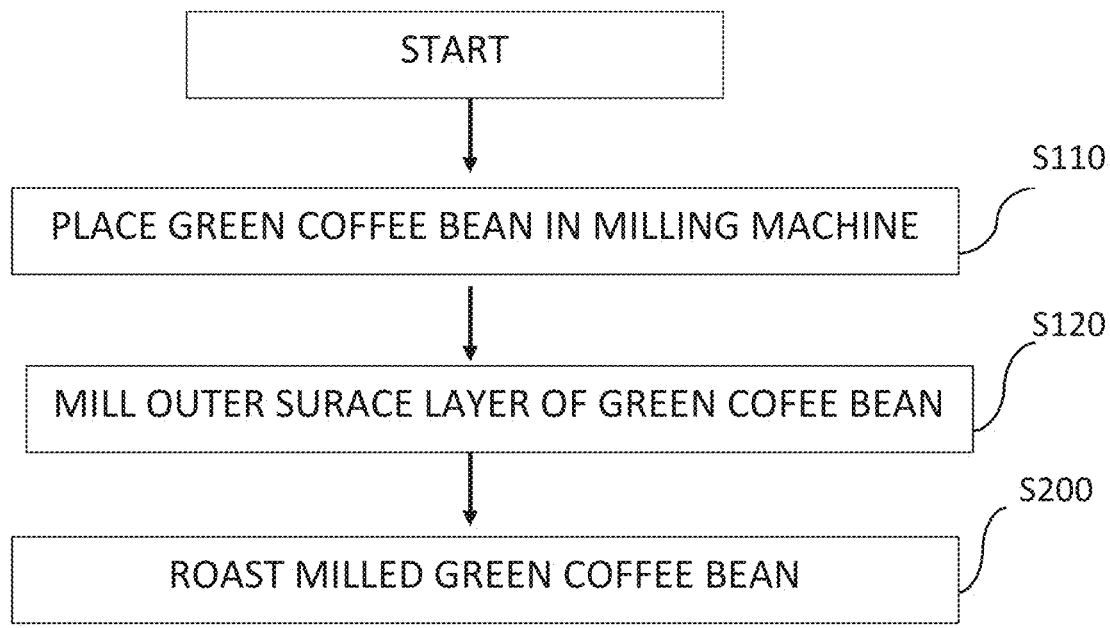
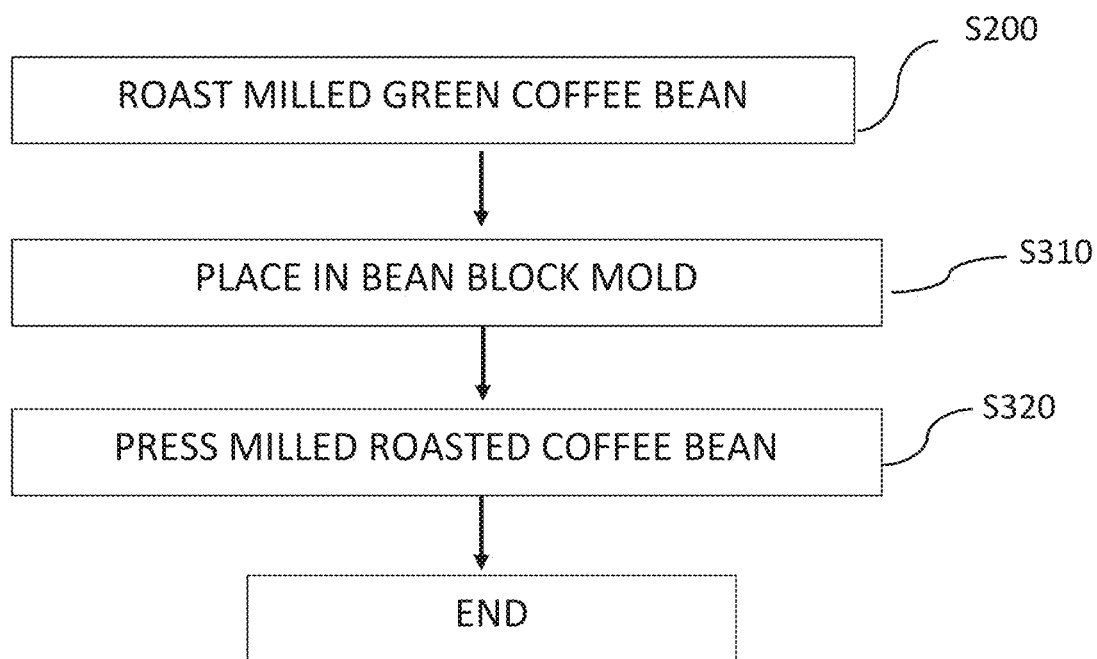

MANUFACTURING METHOD OF COFFEE BEAN COMPRESSION BLOCK

BACKGROUND OF THE INVENTION

Field of the Invention

Embodiments of the present disclosure relate to a method of manufacturing a coffee bean block containing coffee particles. The coffee bean block is used to prepare coffee drinks that allow people to enjoy a uniquely deep and rich flavors of roasted coffee with case by providing a pre-measured amount of coffee to be brewed with convenience.

Description of the Related Art

Several factors that determine a flavor of coffee enjoyed by consumers can include species of coffee beans, a roasting level, an aging time of roasted coffee beans, a bean grinding method, a particle size of ground coffee, a coffee dripping method, a ratio of infused coffee to water, type of water and a temperature of the water, as well as various kinds of additives added to coffee. Various flavors of coffee may be selected according to a personal preference of the consumer.

Generally, a coffee preparing process includes a green-bean selecting step, a green-bean processing step, a green-bean roasting step, a roasted bean grinding step, and a coffee dripping step, among others.

Conventionally, as shown in FIG. 1, roasted coffee beans are ground by a grinder 10 to make coffee grinds or powder to be used in an extraction process. For example, the coffee grinds are infused with water and are dripped using a dripper when a person wants to drink coffee. However, coffee grinds from the grinder are not able to fully capture a unique taste of the roasted coffee beans because grinding shears the roasted coffee beans to expose internal portions of the cells or chambers (or cell interiors) of the roasted coffee beans, thereby spilling and scattering contents of the internal portions of the cells or chambers of the roasted coffee beans. When spilled and scattered during the grinding, the contents of the roasted coffee beans become lost while fibers of cell walls of the roasted coffee beans remain, so that a flavor profile of the roasted coffee bean shifts from that of the unique taste of the roasted coffee bean more towards that of the fibers of the cell walls of the roasted coffee beans.

The contents of the internal portions of the cells or chambers of the roasted coffee beans include lipids, various acids, and flavors of the roasted coffee beans, which lends the roasted coffee beans their unique flavor profile if the contents of the internal portions of the cells or chambers of the roasted coffee beans can be prevented from being lost. However, the unique flavor of the roasted coffee beans is deteriorated in the grinding process because the roasted coffee bean is ground in the roasting and grinding processes, and the grinding process scatters the contents of the internal portions of the cells or chambers of the roasted coffee beans to be lost.

SUMMARY OF THE INVENTION

The embodiments of the present disclosures are directed to addressing a deterioration of a flavor profile of a roasted coffee bean that results from grinding the roasted coffee bean, and are further directed to a method of manufacturing a coffee bean block for brewing coffee with retained flavors.

For example, the embodiments of the present disclosure relate to a method of manufacturing a coffee bean block containing coffee grinds or particles using a milling process and a compressing process, which are intended to prepare coffee drinks that allow people to enjoy a unique, deep and rich flavor of roasted coffee beans that retains the unique, deep and rich flavor of the roasted coffee bean without extraneous tastes such as a carbonization tastes and a burnt taste that are caused by grinding of the roast coffee beans.

Specifically, as conventional grinding of roasted coffee beans causes the coffee cells to shear or tear and break open, such shearing or tearing causes mixing of the contents of coffee cell chamber and components that make up the cell wall or membrane such as fiber, so that taste or flavor of cell membrane forming cell walls are introduced into the flavor profile of coffee brewed from the ground roasted coffee beans.

To counter the introduction of the taste or flavor of the cell membrane from being introduced into the flavor profile of roasted coffee bean, roasted coffee beans are compressed rather than ground to crack open the coffee cell chamber so that the content located within the coffee cell chambers or cell membranes can be accessed, but the contents are not dispersed during a rotational movement of the grinding to become mixed or dispersed. Rather, the compression of the roasted coffee bean maintains the contents of the cell chambers or cell membranes near the opened cell chambers or cell membranes, and are not mixed or dispersed since the compression of the roasted coffee beans simultaneously forms a coffee bean block containing the crushed or pressed coffee particles that are not mixed or dispersed, thus better preserving or maintaining the unique flavor of the roasted coffee beans.

Additionally, the roasted coffee beans are produced by roasting green coffee beans that are first milled to remove an outer layer of the green coffee bean prior to undergoing roasting. Such milling of the green coffee beans removes the fibrous outer surface of the coffee beans that are mostly distal from the cell chambers so that introduction of the flavor of the cell membrane is reduced in the flavor profile of coffee brewed from coffee bean block formed from compressing the roasted coffee beans that have been first milled.

A method of manufacturing a coffee bean block according to an embodiment of the present disclosure includes milling a green coffee bean to remove an outer surface of the green coffee bean to obtain a milled green coffee bean; roasting the milled green coffee bean to obtain a roasted milled coffee bean; placing the roasted milled coffee bean into a forming mold; compressing the roasted milled coffee bean in the forming mold using a pushing rod having a protrusion of a predetermined pattern so that the roasted milled coffee bean is crushed into fragments by the forming mold and the pushing rod; and continue compressing the fragments of the roasted milled coffee bean until the fragments are formed into a compressed coffee block.

A method of manufacturing a coffee bean block according to another embodiment of the present disclosure includes a green coffee bean milling operation to remove an outer surface layer of the green coffee bean to produce a milled green coffee bean; a milled green coffee bean roasting operation of roasting the milled green coffee bean obtained from the green coffee bean milling operation to produce a roasted milled coffee bean; and a roasted coffee bean block making operation of compressing the roasted milled coffee bean obtained from the milled green coffee bean roasting operation to produce a coffee bean block.

The effects according to the present disclosure are not limited to the contents exemplified above, and more various effects are included in the present disclosure.

BRIEF DESCRIPTION OF THE DRAWINGS

The above and other aspects, features and other advantages of the present disclosure will be more clearly understood from the following detailed description taken in conjunction with the accompanying drawings, in which:

FIG. 10 is a flow diagram of a method of making milled coffee beans.

FIG. 11 is a flow diagram of a method of manufacturing the coffee bean block once the coffee bean has been milled and roasted.

DETAILED DESCRIPTION OF THE EMBODIMENTS

Advantages and characteristics of the present disclosure and methods of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the example embodiments of the present disclosure and the scope of the present disclosure. Therefore, the present disclosure will be defined by the scope of the appended claims.

Hereinafter, a method for manufacturing a coffee bean according to embodiments of the present disclosure will be described with reference to the accompanying drawings.

Figure 1:
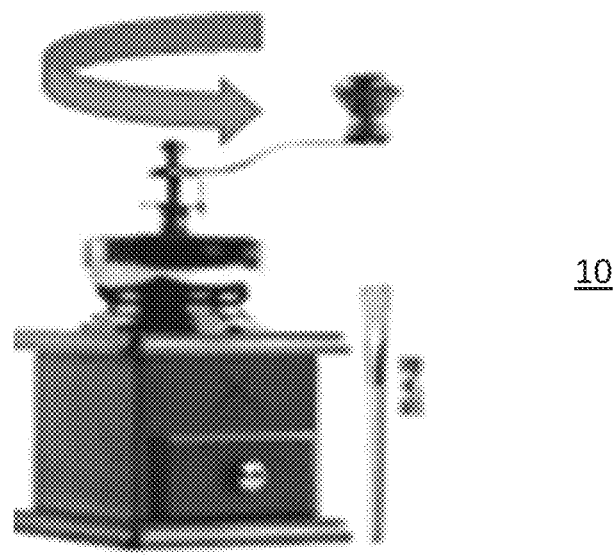
FIG. 1 is an image of a conventional coffee grinder that grinds coffee beans.
Figure 2:
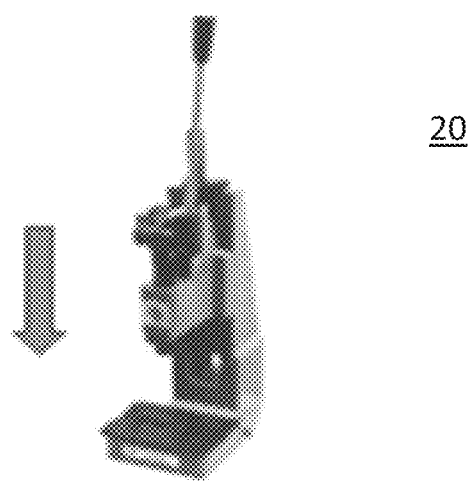
FIG. 2 is a conceptual image of a device for compressing coffee beans according to an embodiment of the disclosure.

FIG. 2 is a conceptual image of a device for compressing coffee beans according to an embodiment of the disclosure.

As provided in FIG. 2, a device 20 can be used to compress roasted coffee beans. The device applies a unidirectional pressure on the roasted coffee beans, whereby the roasted coffee beans are compressed in one direction or along a single direction. By applying pressure in the one direction, the roasted coffee beans are crushed in the one direction so that walls sustaining the internals chambers of the roasted coffee beans crack and the internal chambers collapse under the applied pressure. As pressure application is continued in the one direction, imploded and crushed pieces of coffee beans become compacted to eventually become flattened or compressed. When a vessel is used in the crushing of the roasted coffee beans, the roasted coffee beans can be molded into a shape.

Figure 3:
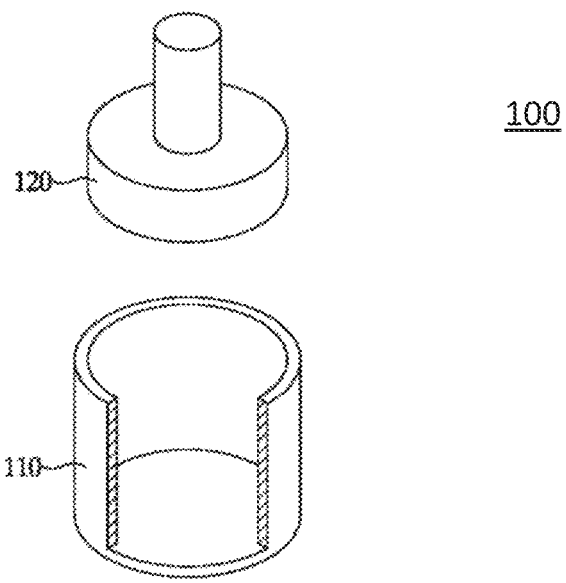
FIG. 3 is a partially cutaway perspective view illustrating one embodiment of an apparatus for manufacturing a coffee bean block.

FIG. 3 is a partially cutaway perspective view illustrating one embodiment of a receiving member (or vessel) of an apparatus for manufacturing a coffee bean block (or coffee bean compression block). The apparatus for manufacturing the coffee bean block according to an embodiment of the disclosure can include the receiving member 100 (or vessel) in a form of a mold 110 having a shape of a tub or a bowl, which can be paired with a push rod 120 having a disc shape. The push rod 120 can be inserted into the mold 110 to crush and compress the roasted coffee bean when the roasted coffee bean is accommodated in the mold 110.

Although each of the mold 110 and the push rod 120 is illustrated as having a circular cross-section, embodiments of the present disclosure are not limited thereto. For example, at least one of the mold 110 and the push rod 120 can have a shape including a circle, a triangle, a rectangle, a hexagon, an octagon, an ellipse, a heart, a water drop, a hemisphere or others, and can be any shape without being limited to the circular cross-section.

Figure 4:
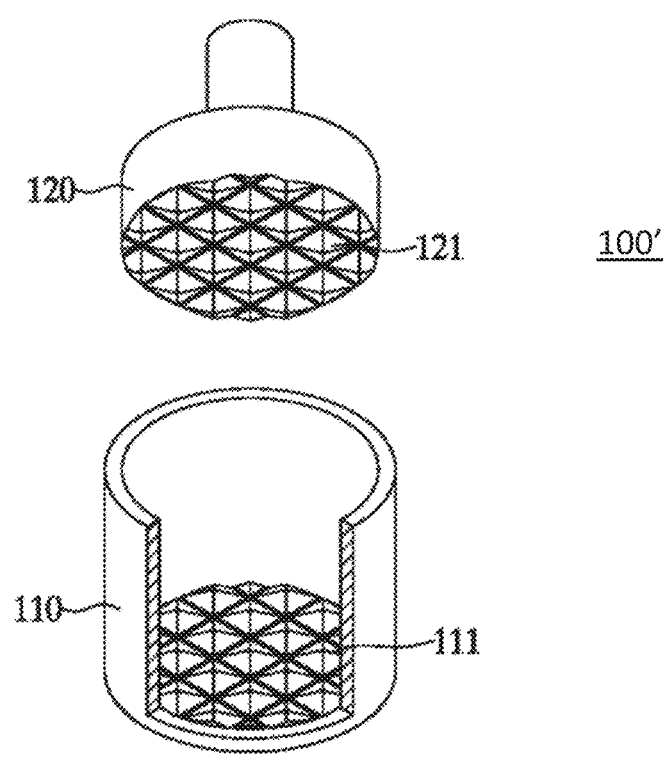
FIG. 4 is a partially cutaway perspective view illustrating another embodiment of an apparatus for manufacturing the coffee bean block.

FIG. 4 is a partially cutaway perspective view illustrating another embodiment of a receiving member (or vessel) of an apparatus for manufacturing the coffee bean block. The apparatus for manufacturing the coffee bean block according to this embodiment can include the receiving member 100' (or vessel) in a form of a mold 110 having the shape of a tub or a bowl, which can be paired with a push rod 120 having a disc shape. The push rod 120 can be inserted into the mold 110 to crush and compress the roasted coffee bean when accommodated in the mold 110. An uneven part having an angled protrusion 111 can be formed on a surface of the mold 110, while an uneven part having an angled protrusion 121 can be formed on a surface of the disc of the push rod 120, and engage with the angled protrusion 111 that is formed on the mold 110.

Although each of the angled protrusions 111 and 121 is illustrated as having the shape of a quadrangular pyramid, the embodiments of the present disclosure are not limited thereto. For example, at least one of the angled protrusions 111 and 121 can have various shapes including a cone, a hexagonal pyramid, an octagonal pyramid, and other shapes. As structures having protrusions, the angled protrusions 111 and 121 can apply uniform pressure in several directions, and thus, the angled protrusions 111 and 121 can more smoothly perform the compressive-forming of the coffee bean block in conjunction with the mold 110 and the push rod 120 as compared to when the mold 110 and the push rod 120 only have a smooth surface to contact and crush the roasted coffee beans.

That is, in the process of forming the coffee bean block by the uneven parts including the angled protrusions 111 and 121, the roasted coffee beans can be crushed more evenly and be separated into particles. When both the push rod 120 and the mold 110 have the angled protrusions 121 and 111, respectively, an apex of the angle protrusion 121 can be aligned with four corners of bases of four of the angle protrusions 111, while an apex of the angled protrusion 111 can be aligned with four corners of bases of the angled protrusions 121.

Although disclosed as having protrusions, the uneven parts of the mold 110 and the push rod 120 can include depressions that are in a shape of a recessed quadrangular pyramid or other shapes. For example, the mold 110 can have the uneven part entirely formed of the angled protrusions 111 and the push rod 120 can also have the uneven part entirely formed of the angled protrusions 121 as shown in FIG. 4, but embodiments of the present disclosure are not limited thereto. For example, the mold 110 can have the angled protrusions 111, while the push rod 120 can include the depressions that correspond to the angled protrusions 111 of the mold 110. Oppositely, the mold 110 can include the depressions while the push rod 120 can include the angled protrusions 121 that correspond to the depressions of the push rod 120. But embodiments of the present disclosure are not limited thereto.

In other embodiments of the disclosure, the push rod 120 can have an arrangement of both the angle protrusions 121 and the depressions that are arranged on the surface of the disc of the push rod 120, and the mold 110 can include an arrangement of both the angled protrusions 111 and the depressions that are arranged on a bottom surface of the mold 110 to correspond to those of the push rod 120.

Figure 5A:
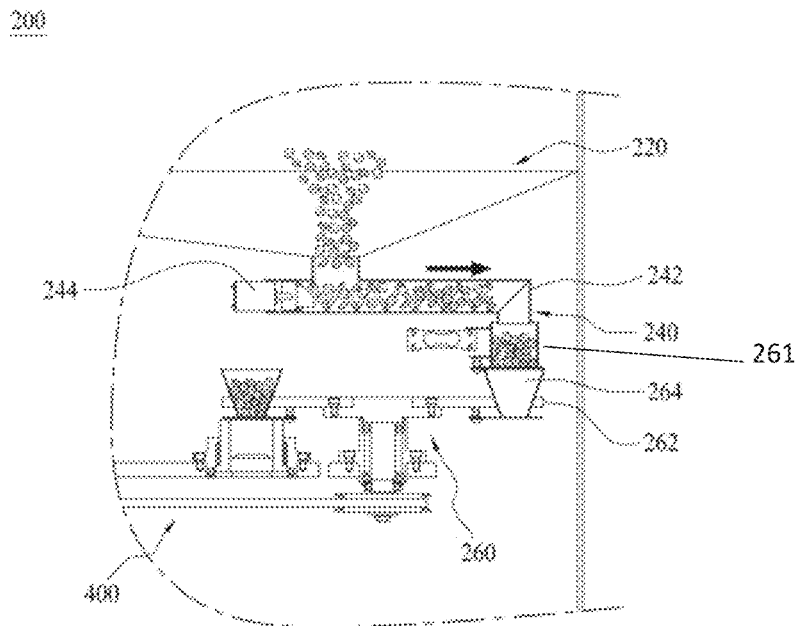
FIG. 5A is a view showing a part of a supply part of the coffee bean block manufacturing apparatus according to an embodiment of the disclosure.

FIG. 5A is a view showing a part of a supply part of a coffee bean block manufacturing apparatus according to an embodiment of the disclosure. As shown in FIG. 5A, the coffee bean block manufacturing apparatus 200 can include a hopper member 220 to accommodate roasted coffee beans, a transmission member 240 to transfer the roasted coffee beans, a rotation member 260 to measure out a predetermined amount of the roasted coffee beans and to provision the predetermined amount of the roasted coffee beans, a transport unit 400 that rotates the rotation member 260 from a receiving position to a provisioning position, and a receiving member 440 to receive the roasted coffee beans provisioned by the rotating member 260 at the provisioning position. But embodiments of the disclosures are not limited thereto, and additional elements or members can be included in the coffee bean block manufacturing apparatus 200.

In embodiments of the present disclosure, the hopper member 220 is able to receive the roasted coffee beans and to hold the roasted coffee beans for a predetermined time. To accomplish this task, the hopper member 220 can have a first opening to receive the roasted coffee beans, and a second opening to release the roasted coffee beans. In embodiments of the present disclosure, the first opening and the second opening can be different sizes. For example, the first opening can have a greater size than that of the second opening.

The transmission member 240 can include a discharge tube 242 having an inlet to receive the roasted coffee beans and an outlet to output the roasted coffee beans. The transmission member 240 can also include a controlling element 244 that controls receipt, transfer, and output of the roasted coffee beans as the roasted coffee beans are moved or transported through an interior of the transmission member 240. The roasted coffee beans can be moved through the interior of the transmission member 240 by various means. Such means can include a piston to push the roasted coffee beans, or can be means that transport the roasted coffee beans, such as a screw or a screw mechanism that rotates along an axis and sequentially moves the roasted coffee beans from the inlet to the outlet of the transmission member 240, but embodiments of the present disclosure are not limited thereto, and other means of transporting the roasted coffee beans can be used. For example, the transmission member 240 can be tilted so that gravity is used to move the roasted coffee beans from the inlet to the outlet.

As the roasted coffee beans arrive at the outlet of the transmission member 240, a drive motor can be provided at an end of the discharge tube 242 which can discharge the roasted coffee beans to a holding chamber so that a precise or predetermined amount of roasted coffee beans is measured and delivered. When discharging the predetermined amount of the roasted coffee beans, a lower part of the discharge tube 242 can be opened and closed.

Also, instead of relying on gravity and a downward slope of the discharge tube 242, the discharge tube 242 can be horizontal or can be sloped upward from the inlet to the outlet. When the discharge tube 242 is horizontal or sloped upward, a more precise control of an amount of roasted coffee beams can be supplied to the second end of the discharge tube 242 by use of an internal moving device such as the screw or the screw mechanism that can rotate about an axis extending from a first end to a second end, and move the roasted coffee beans from the first end adjacent the inlet to the second end adjacent the outlet. A drive motor can be connected to the screw to rotate the screw.

The amount of the roasted coffee beans can be calibrated in part by the number of rotations the screw is rotated, for example. The roasted coffee beans that are measured and driven by the screw from the inlet to the outlet of the discharge tube 242 can then exit through the outlet to be held by a measurer 261 located adjacent the outlet of the discharge tube 242. The measurer 261 can include a weight device that can precisely measure an amount of roasted coffee beans to be supplied to a supply cup 262. The supply cup 262 can deliver the roasted coffee beans to a receiving member 440 that can crush and shape the roasted coffee beans into a coffee bean block.

In various embodiments of the present disclosure, the measurer 261 can include a receiving end to receive the amount of roasted coffee beans and a supplying end that discharges the roasted coffee beans once a precise amount of roasted coffee beans are received in the measurer 261. The sizes or dimensions of the receiving end and the supplying end of the measurer 261 can be the same or different sizes. When of different sizes, the size of the receiving end can be greater than the size of the supplying end. A door can be located at each of the receiving end and the supplying end of the measurer 261 to assist in the measurer 261 providing the precise amount of the roasted coffee beans to the supply cup 264, whereby the door at the receiving end can close as soon as the precise amount of roasted coffee beans are supplied to the measurer 261, and the door at the supplying end can open simultaneously or as soon as the precise amount of roasted coffee beans is measured. However, the opening and closing of the doors at the receiving end and the supplying end of the measurer 261 can be at different times in various embodiments of the present disclosure.

The supply unit 200 can further include the rotation member 260. The supply unit 200 can be linked to a driving pulley in order to be connected with a transport unit 400 via a means such as a belt, and the link between the supply unit 200 and the transport unit 400 enables the rotation member 260 to circulate between the receiving member 440 and the measurer 261. The driving pulley connected to the belt can rotate about an axis, and can supply a rotational movement to one or more supply plates 262 that support one or more supply cups 262.

Figure 5B:
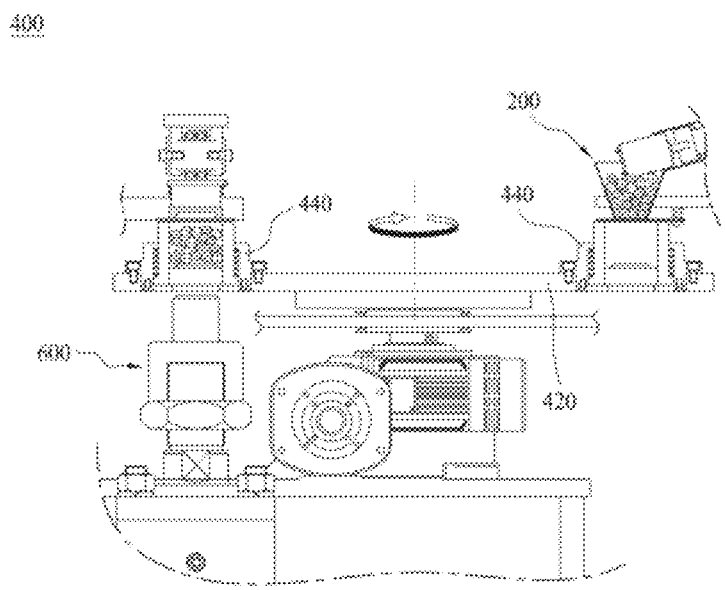
FIG. 5B is a view showing an arrangement a transfer unit with interacts with a pressing unit that is located to overlap with the transport unit.

FIG. 5B is a view showing an arrangement of a transfer unit 400 that interacts with a pressing unit 600 that is located to overlap with the transport unit 400. Pressing portions of the pressing unit 600 can be arranged on opposite sides of the transfer unit 400 and form a gap therebetween so as to allow the transfer unit 400 to rotate in between the pressing portions and to align with the pressing unit 600. The pressing portions can be provided in a pair, so that a first pressing portion can press down from an upper side and a second pressing portion can press up from a lower side of the transfer unit 400.

Figure 6:
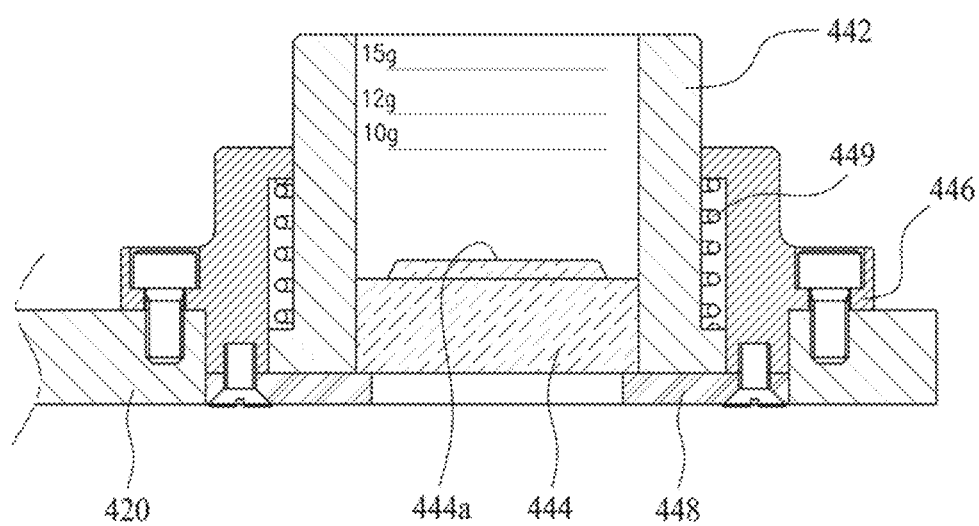
FIG. 6 is a view showing a receiving member of the coffee bean block manufacturing apparatus according to an embodiment of the disclosure.

FIG. 6 is a view showing a receiving member of the coffee bean block manufacturing apparatus according to an embodiment of the disclosure. As shown in FIG. 6, the transfer unit 400 can include a rotation plate 420 and a receiving member 440 supported by the rotation plate 440. The receiving member 440 can include a receiving body 442, a compression plate 444, a pattern generating plate 444a, a support plate 446, a fixing plate 448 and an elastic member 449. But embodiments of the present disclosure are limited thereto.

The receiving member 440 has the receiving body 442 having a first side that is open to receive roasted coffee beans from the coffee bean block manufacturing apparatus 200 and a second side that is opposite to the first side. The compression plate 444 can be located within the receiving body 442, and the compression plate 444 can be movable within the receiving body 442. The fixing plate 448 can include an aperture that overlaps the compression plate 444 to receive the second pressing portion of the pressing unit, while the first pressing portion can be received into the receiving body from the first side of the receiving body. When in operation, the first pressing portion and the second pressing portion can compress the roasted coffee beans within the receiving body 442 from opposite sides of the receiving body to form the coffee bean block by compression.

In other embodiments of the present disclosure, the second pressing portion need not extend through the aperture in the fixing plate 448, but can simply support the fixing plate 448 while the first pressing portion presses the roasted coffee beans located within the receiving body 442 from the first side of the receiving body 442.

The receiving member 440 can be detached from the rotation plate 420 for case of cleaning, or for replacement when the receiving member 440 or any parts thereof becomes worn or broken. Also, when a size of the coffee bean block or an amount of coffee particles are to be changed, a different sized receiving member 440 can be attached to the rotation plate 420. Various means of attaching the receiving member to the rotation plate 420 can be used, such as screws, rivets, and others.

The receiving body 442 can be inserted into a space formed by the support plate 446 and be seated therein. The elastic member 449 can be provided in the space or gap between the receiving body 442 and the support plate 446 to maintain contact between the receiving body 446 and the fixing plate 448 but allow for movement of the receiving body 442 relative to the fixing plate 448.

The compression plate 444 can be fixed to at least one of the receiving body 446 and the fixing plate 448, or can be movable within the receiving body 442. The receiving body 442, the compression plate 444 and the first and second pressing portions can have a cylindrical shape, but such is not required, as other shapes can be provided such as rectangular, polygonal, hemispherical, semicircular, or annular in order to mold a shape the coffee bean block accordingly.

The pattern generating plate 444a can be formed or placed on a surface of the compression plate 444 that faces an interior of the receiving body 442 towards the roasted coffee beans. A pattern provided by the pattern generating plate 444a can be the shape of the quadrangular pyramid as discussed above or other shapes as previously discussed. The pattern provided by the pattern generating plate 444a can be imparted onto the coffee bean block. Also, the first pressing portion of the pressing unit 600 can also have a pattern to be imparted onto the coffee bean block, which can be the same or different than that of the pattern generating plate 444a.

In various embodiments of the present disclosure, the receiving member 440 corresponds to the receiving member 110 and 110' of FIGS. 3 and 4, respectively. For example, the receiving body 442 can correspond to the mold 110, the first pressing portion can correspond to the push rod 120, and the pattern generating plate 444a and correspond to the angled protrusions 111.

Figure 7:
FIG. 7 is a depiction of a milling device usable to mill green coffee beans.

FIG. 7 is a depiction of a milling device usable to mill green coffee beans. The milling device according to an embodiment of the disclosure can include a cylindrical vessel having mesh walls, a rotating blade in a center of the cylindrical vessel to stir green coffee beans when accommodated in the cylindrical vessel, and a cover that closes the milling device. As the rotating blade is rotated by a motor, the green coffee beans are stirred and come into contact with the mesh wall that acts as a grater to cut away or mill an outer surface layer of each coffee bean. In embodiments of the present disclosure, the milling device can be provided to have a blade in the center that is non-rotating and instead, have the cylindrical vessel with the mesh walls be rotating to mill the green coffee beans. In other embodiments of the present disclosure, both the blade and the cylindrical vessel can be rotating, either in a same direction or in opposite directions. If rotating in the same direction, the speed of rotation between the blade and the cylindrical vessel can be the same or different. The speeds of rotation for the blade and the cylindrical vessel can vary in both the same direction rotation and the opposite direction rotations. In various embodiments of the present disclosure, green coffee beans refer to coffee beans that have not undergone a roasting process or has undergone a partial roasting process. For example, green coffee beans can refer to any bean that that has been dried and up to a bean that has gone through a partial roasting process, but embodiments of the present disclosure are not limited thereto. For example, green coffee beans can refer to roasted beans that have become darker via application of heat, but have not yet formed a first crack.

The coffee bean that is milled can be a green coffee bean that has not been roasted. For example, after being dried, but before being roasted, the green coffee beans can be milled to remove a thin layer of an outer surface of the green coffee bean. An amount of removal can be between 0.01 um to 10 um in thickness, such as between about 0.05 um to 5 um, between about 0.09 um to 2 um, between about 0.09 um to 1.0 um, between about 0.09 um to 0.5 um, between 0.09 um to 0.4 um, between 0.09 um to 0.3 um, between 0.09 um to 0.2 um, between 0.09 um to 0.15 um, between 0.09 um to 0.13 um, between 0.09 um to 0.11 um, or other range between about 0.01 um to 1.0 um. In other embodiments, an amount of the outer surface of the green coffee bean that is milled is about 0.1 um in depth or thickness.

Figure 8:
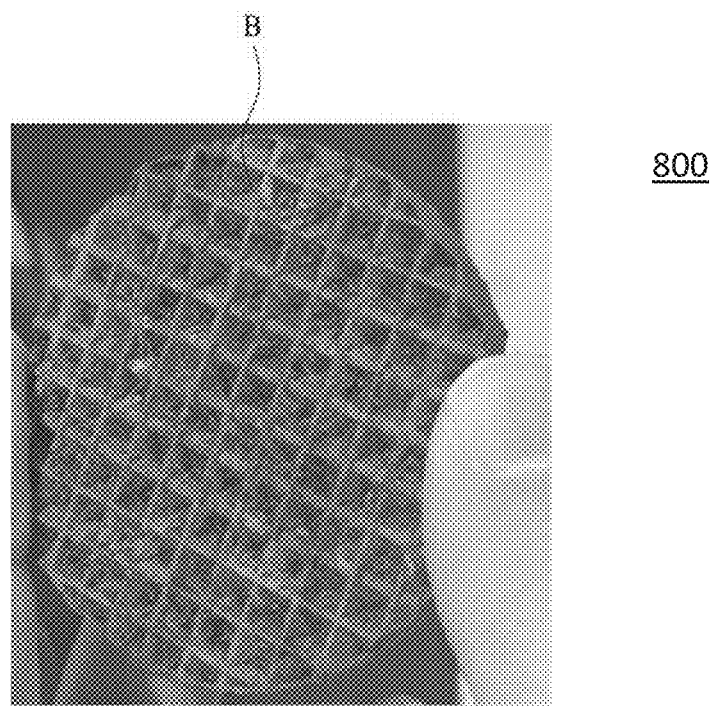
FIG. 8 is a view of a coffee bean block according to an embodiment of the disclosure.

FIG. 8 is a view of a coffee bean block according to an embodiment of the disclosure. The coffee bean block 800 according to an embodiment of the disclosure can have uneven parts B formed on surfaces of the coffee bean block, for example, upper and lower surfaces thereof.

The uneven parts B according to this embodiment are formed when pressure is evenly applied to coffee grains in the process for forming the coffee bean block to allow each bean to be uniformly separated into fine-sized particles in the compressing process, thereby increasing the contact area of the particles with water in the process of extracting the coffee such as an espresso, dripping or brewing the beans in water to prepare various coffee drinks, and maintaining a uniform coffee taste without the impure taste of the fibers of the coffee beans.

In embodiments of the present disclosure, the uneven parts B can be various patterns such as concentric patterns, other geometric patterns, animal patterns, or trademark patterns, company logos, text, letters or scripts, or one or more combinations thereof. Also, the upper and lower surfaces of the coffee bean block need not include the uneven parts B or the patterns, and can be smooth, or partially smooth and partially patterned. In other embodiments of the present disclosure, the lateral surface or edge of the coffee bean block can also include the uneven parts B or various patterns.

When about 100 grams of milled and roasted coffee beans are used to make the coffee bean block, and when a 700 grams of water at 95 degree Celsius is used to brew coffee for 3 minutes, about 540 grams to 560 grams of coffee can be provided. The coffee brewed from a coffee bean block that was made using milled and roasted coffee beans can have a brix value between about 2.22 brix to 3.5 brix, for example, about 2.4 brix.

Figure 9:
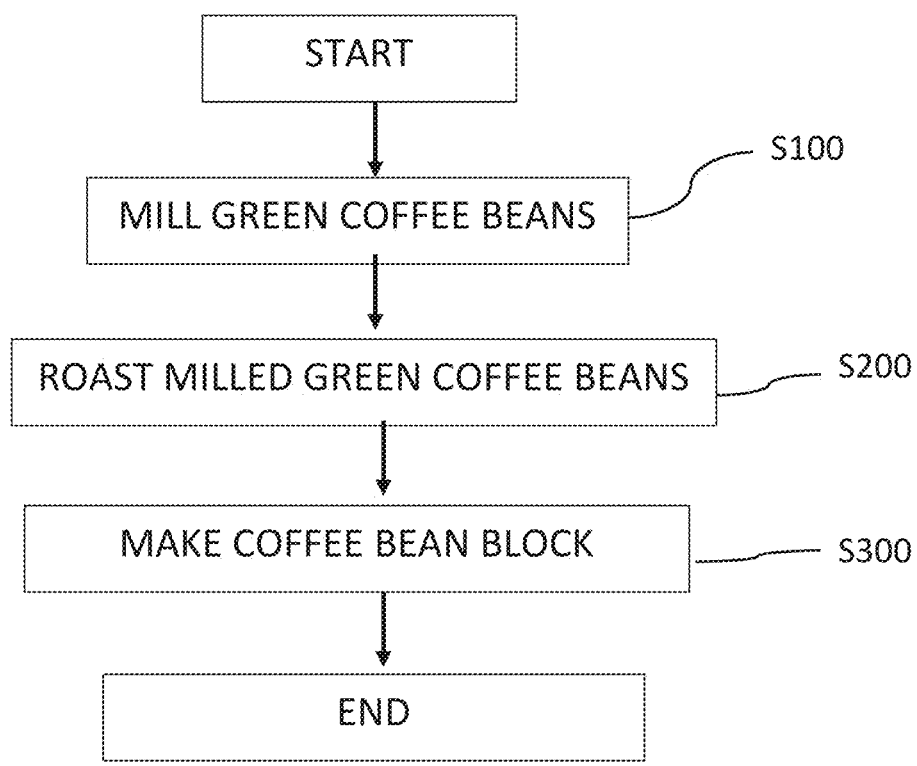
FIG. 9 is a flow diagram of a method of manufacturing a coffee bean block using milled coffee beans.

FIG. 9 is a flow diagram of a method of manufacturing a coffee bean block using milled coffee beans. As shown in FIG. 9, the method can include a green coffee bean milling operation S100, a milled green coffee bean roasting operation S200 and a roasted coffee bean block making operation S300. In various embodiments of the present disclosure, operations S100, S200 and S300 can be performed in the order shown, but embodiments of the present disclosure are not limited thereto. For example, the green coffee bean milling operation S100 can be performed to produce milled green coffee bean, which can be sold without performing the subsequent operations of roasting the milled green coffee beans and/or making the coffee bean block, or milled green coffee beans can be purchased or obtained to perform the operations of roasting the milled green coffee beans and/or making the coffee bean block. Further, the operations of the method need not be performed in close chronological order, but can be performed with gaps in time of over several hours, days or weeks.

In various embodiments of the present disclosure, the green coffee bean milling operation S100 can be performed using a milling device, and such milling device can include that shown in FIG. 7, or other milling devices such as commercial milling devices that can mill green coffee beans in greater scale, or commercially.

In various embodiments of the present disclosure, the milled green coffee bean roasting operation S200 can be performed using a home roasting device or roasting devices such as commercial roasting devices that can roast green coffee beans in greater scale, or commercially.

In various embodiments of the present disclosure, the roasted coffee bean block making operation S300 can be performed using a compressing device, a vessel, a receiving member, a supply part and/or apparatus for manufacturing a coffee bean block as shown in FIGS. 2, 3, 4, 5A, 5B and 6, or other devices such as commercial coffee bean block manufacturing devices that can make roasted coffee bean blocks commercially.

In various embodiments of the present disclosure, the method of manufacturing a coffee bean block using milled coffee beans is not limited to the operations shown in FIG. 9, but can further include additional operations.

FIG. 10 is a flow diagram of a method of making milled coffee beans. FIG. 10 shows a detail of the green coffee bean milling operation S100 of FIG. 9. As shown in FIG. 10, the method of making milled coffee beans can include a green coffee bean placing operation S110 of placing the green coffee bean in a milling machine or a milling device and an outer surface layer milling operation S120 of milling an outer surface layer of the green coffee bean. Once the outer surface layer milling operation S120 is performed, the milled green coffee bean can further proceed to being roasted (S200).

During the outer surface layer milling operation S120, green coffee beans can be milled for between about 10 seconds to 30 minutes. The milling operation of the green coffee beans can proceed continuously for a pre-determined time, or can be separated into two or more time periods. In one embodiment of the present disclosure, the green coffee bean can be milled for a total of 30 minutes, in 5 minute increments so that 6 increments are provided. The time for each increment, and the number of increments can be varied. Another embodiment of the present disclosure includes a total milling time of about 21 minutes, and includes 3 increments, so that the time for each increment can be about 7 minutes. The amount of non-milled green coffee beans used can be about 250 grams for each batch, but embodiments of the present disclosure are not limited thereto.

Additionally, during the outer surface milling operation S120, the green coffee bean can be milled to remove the thin layer of the outer surface of the green coffee bean. An amount of removal can be between 0.01 um to 10 um in thickness, such as between about 0.05 um to 0.5 um, or between about 0.09 um to 0.2 um, between about 0.09 um to 1.0 um, between about 0.09 um to 0.5 um, between 0.09 um to 0.4 um, between 0.09 um to 0.3 um, between 0.09 um to 0.2 um, between 0.09 um to 0.15 um, between 0.09 um to 0.13 um, between 0.09 um to 0.11 um, or other range between about 0.01 um to 1.0 um. In other embodiments, an amount of the outer surface of the green coffee bean that is milled is about 0.1 um in depth or thickness thereof.

FIG. 11 is a flow diagram of a method of manufacturing the coffee bean block after the coffee bean has been milled and roasted. FIG. 11 shows a detail of the roasted coffee bean block making operation S300 of FIG. 9. As shown in FIG. 11, the method of manufacturing the coffee bean block can include a roasted coffee bean placing operation S310 of placing the roasted coffee bean in a bean block mold, the roasted coffee bean being sourced from the coffee bean roasting operation S200. The method further includes a roasted coffee bean pressing operation S320 of pressing the roasted milled coffee bean using the bean block mold. Thereafter the operation ends.

In the method of FIG. 11, the bean block mold used can be the vessel, the receiving member, or any apparatus for manufacturing a coffee bean block as shown in FIGS. 2, 3, 4, 5A, 5B and 6, but embodiments of the present disclosure are not limited thereto.

In embodiments of the present disclosure, the process of manufacturing the coffee bean block involves placing the milled and roasted whole coffee beans into a certain mold, and the milled and roasted whole coffee beans are pressed into a shape of the mold, such as a disc shape.

The coffee bean block can be made by pressing the milled and roasted whole coffee bean by applying a certain pressure. At this time, a volume of the whole coffee beans can be reduced by greater than half of an original volume of the whole coffee beans. In various embodiments of the present disclosure, the volume of the coffee bean block can be about ½ or less of the original volume of the whole coffee beans, for example, ⅖ or less. In one embodiment of the present disclosure, the volume of the coffee bean block can be about ⅕ of the original volume of the whole coffee beans. The compression of the whole coffee beans into a coffee bean block can be expressed as a ratio.

Assuming that a volume of the whole coffee bean is $V0$ and a volume of a compressed coffee bean block is $V1$, a ratio of $V1/V0$ can be about 0.15 to 0.5 according to a roasting level and an extraction method of the coffee bean. In embodiments of the present disclosure, the $V1/V0$ can be any value between about 0.15 to 0.5. For example, the ratio of $V1/V0$ can be about 0.2.

When the compression ratio is 0.5 or more, a formability of the coffee bean block can be deteriorated and the whole coffee beans may be separated into large particles, so that a solubility in water may become poor. Meanwhile, when the compression ratio is 0.1 or less, pressure should be correspondingly increased, so that a large amount of fat ingredients may be undesirably extracted.

When compressing the whole coffee beans, a pressure that can be applied is equal to or greater than about 1500 kg/cm². When the pressure is less than 1500 kg/cm², the coffee particles constituting the coffee bean block can remain large in size, so that the coffee particles are difficult to dissolve in water. But embodiments of the present disclosure are not limited thereto, and pressures less than 1500 kg/cm² can be used in various embodiments.

A protrusion of a predetermined pattern is disposed on any one of the forming mold and the push rod to imprint a protrusion shape. In this instance, the whole coffee beans are those that have been milled and/or roasted before being pressed.

In embodiments of the present disclosure, the compressing occurs in only one direction. The compression causes crushing of the whole coffee beans to occur. As pressure is applied to the whole coffee beans, the forces applied to the cell walls of the whole coffee beans breaks the cell walls to cause a collapse of the cell rooms, or the internal portions of the cells or chambers, or the cell interiors of the roasted coffee beans.

The coffee bean block according to embodiments of the present disclosure is configured such that much fiber constituting the cell membrane of the whole coffee beans is not destroyed and add to the flavor of the coffee drink, like when grinding the whole coffee beans by a blade. By the process of compressive forming of the coffee bean block, relatively many cracks are formed along a honeycomb-shaped cell membrane constituting the whole coffee beans, and the whole coffee beans are separated into fine coffee particles in this process, so that an impure taste of coffee caused by destruction of the fibers of the coffee cell membrane due to contact of fiber with a grinding blade of a grinder is not generated when coffee is prepared by dripping or brewing the coffee bean block or the coffee particles in water, thus minimizing the impure taste of coffee such as burnt taste, and no frictional heat is applied to the whole coffee beans by the grinding blade, thus minimizing burnt taste due to carbonization due to heat from friction.

Figure 12A:
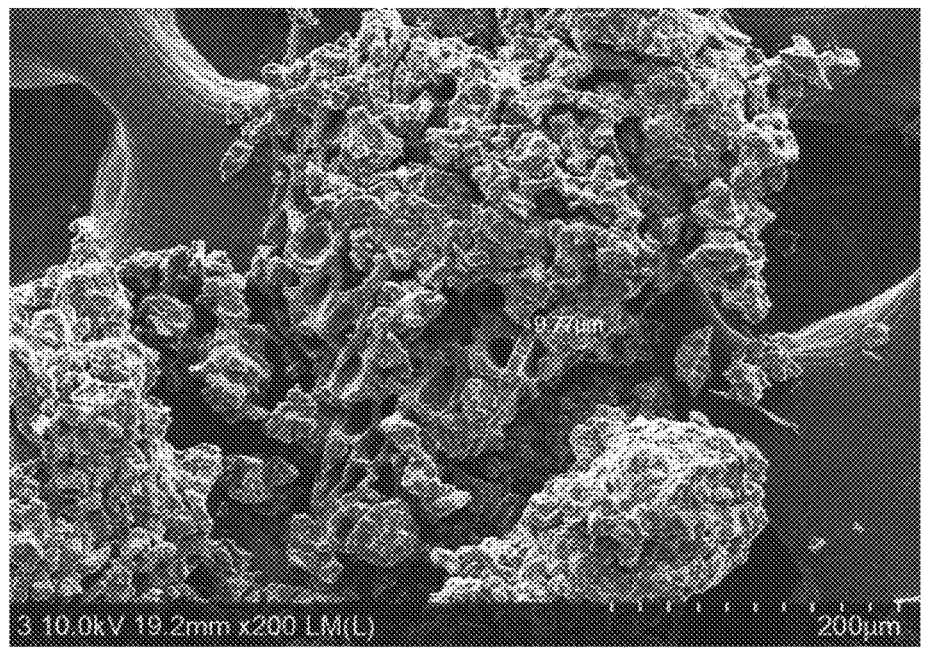
FIG. 12A is an SEM view of crushed coffee particles after compressing of the roasted coffee beans.
Figure 12B:
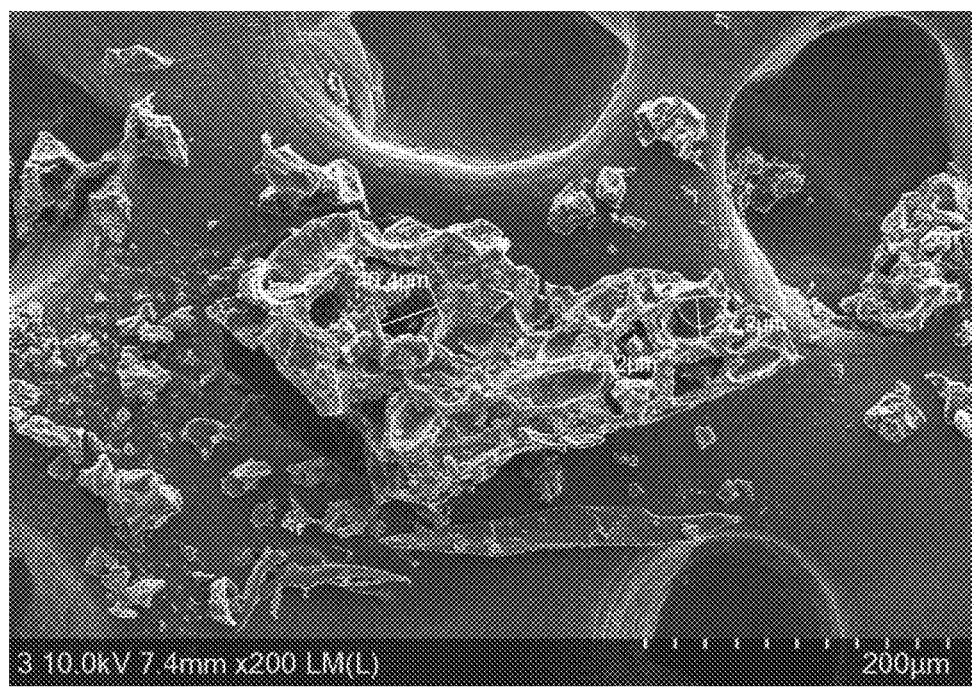
FIG. 12B is another SEM view of crushed coffee particles after compressing of the roasted coffee beans.
Figure 12C:
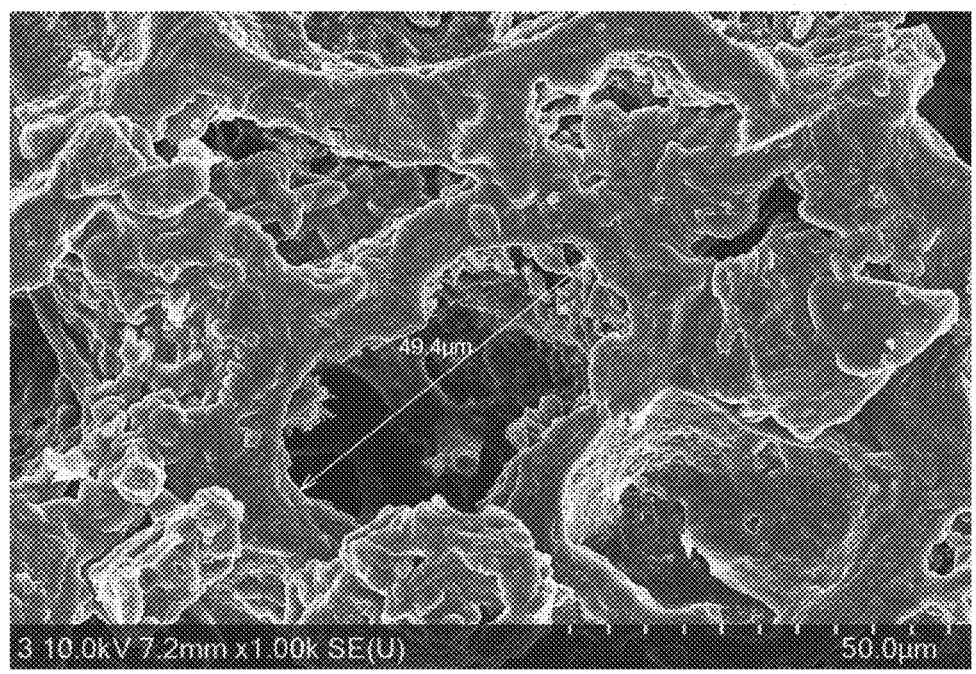
FIG. 12C is yet another SEM view of crushed coffee particle at a greater magnification.

FIG. 12A is a scanning electron microscope (SEM) view of crushed coffee particles after compressing in 200 times magnification. FIG. 12B is another scanning electron microscope (SEM) view of crushed coffee particles after compressing in 200 times magnification. FIG. 12C is yet another scanning electrode microscope (SEM) view of crushed coffee particle at 1000 times magnification.

Unlike roasted coffee beans that have been ground using coffee grinders, crushed coffee particles are generated by applying pressure in only one direction. As shown in FIGS. 12A, 12B and 12C, a significant portion of the coffee particles show a compressed appearance where internal cells or chamber are collapsed. Because the cell walls are not shredded in the crushed coffee particles, unlike those of ground coffee particles, it can be seen that the cell wall thickness is uniform. That is, although the cells themselves are destroyed due to compression, but the cell walls are not torn and the original cell wall shape of the coffee beans are maintained. Further, even when the cell chamber of the coffee particle have collapsed, the cell wall is simply broken open and there are many parts where the cell wall components are not exposed.

Additionally, when coffee of milled, compressed or crushed coffee particles are compared to coffee of normally ground coffee particles, differences appear in terms of caffeine and acrylamide, among others. Acrylamide has posed a concern as a possible carcinogen in some studies. As shown in Table 1, below, coffee of milled, compressed particles (A) have less caffeine compared to coffee of the particles of the comparative example (B) that have been ground normally. For example, caffeine in (A) can be about 94.01 mg/100 g and caffeine in (B) can be about 133.36 mg/100 g, so that a ratio of (A)/(B) of caffeine is about 70%. Accordingly, the amount of caffeine in coffee of milled, compressed or crushed coffee particles can be less than that of normally ground coffee particles.

Also, as shown in Table 1, below, coffee of milled, compressed particles (A) have less acrylamide compared to coffee of the particles of the comparative example (B) that have been ground normally. For example, acrylamide in (A) can be about 12.5 µg/kg and acrylamide in (B) can be about 17.21 µg/kg, so that a ratio of (A)/(B) of acrylamide is about 73%. Accordingly, the amount of acrylamide in coffee of milled, compressed or crushed coffee particles can be less than that of normally ground coffee particles.

TABLE 1

| Item | Unit | Milled, Compressed Coffee (A) | Comparative Example (B) | (A)/(B) |
|---|---|---|---|---|
| Caffeine | mg/100 g | 94.01 | 133.36 | 70% |
| Acrylamide | µg/kg | 12.5 | 17.21 | 73% |

According to an aspect of the invention, the method for manufacturing a coffee bean block, for a coffee drink intended to reduce burnt taste and increase flavor in the coffee drink, with a protrusion shape being imprinted on the block, includes milling a coffee bean to remove an outer surface of the coffee beam. Thereafter, the coffee bean is placed into a forming mold. Once in the forming mold, the coffee bean is compressed in the forming mold using a pushing rod having protrusion of a predetermined pattern so that the coffee bean is crushed into fragments by the forming mold and the pushing rod. The fragments of the coffee bean are continued to be compressed until the fragments are formed into a compressed block.

The reason is as follows: if the roasted coffee bean is compressed without any process, cracks occur along the cell membrane of a honeycomb structure constituting the bean in the process of compressing the coffee bean to finely separate it into small coffee particles, so that the forcible destruction of the fiber constituting the cell membrane of the coffee bean is reduced, and thereby various impure tastes of coffee included in the fiber are not generated, thus reducing the impure taste such as the burnt taste of coffee, and the frictional heat between the grinding blade and the coffee bean generated during the grinding is eliminated, so that the burnt taste of the coffee fat is minimized, and coffee oil ingredients making aroma deep ooze out and flavor is retained, so that a rich coffee body is achieved and the unique flavor of the coffee is retained.

Although the example embodiments of the present disclosure have been described in detail with reference to the accompanying drawings, the present disclosure is not limited thereto and can be embodied in many different forms without departing from the technical concept of the present disclosure. Therefore, the example embodiments of the present disclosure are provided for illustrative purposes only but not intended to limit the technical concept of the present disclosure. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A method of manufacturing a coffee bean block, the method comprising:
   milling a green coffee bean to remove an outer surface of the green coffee bean to obtain a milled green coffee bean;
   roasting the milled green coffee bean to obtain a roasted milled coffee bean;
   placing the roasted milled coffee bean into a forming mold;
   compressing the roasted milled coffee bean in the forming mold using a pushing rod having a protrusion of a predetermined pattern so that the roasted milled coffee bean is crushed into fragments by the forming mold and the pushing rod; and
   continue compressing the fragments of the roasted milled coffee bean until the fragments are formed into a compressed coffee block,
   wherein an amount of the outer surface that is milled is greater than about 0.01 um in depth so that an amount of acrylamide in coffee from the compressed coffee block of the roasted milled coffee bean is less than about 17.21 µg/kg.

2. The method of claim 1, wherein, when a volume of the roasted milled coffee bean is V0 and a volume of the compressed coffee block is V1, a ratio of V1/V0 is about 0.15 to 0.5.

3. The method of claim 2, wherein the ratio of V1/V0 is about 0.2.

4. The method of claim 1, wherein the protrusion of the predetermined pattern is disposed on at least one of the forming mold and the push rod to imprint a protrusion shape.

5. The method of claim 1, wherein an amount of the outer surface that is milled is about 0.09 um to 0.11 um in depth.

6. The method of claim 5, wherein the amount of the outer surface that is milled is about 0.1 um in depth.

7. The method of claim 1, wherein the forming mold has a shape of a tub or a bowl, and is paired with the push rod having a disk shape.

8. The method of claim 1, wherein the forming mold includes a receiving member including a receiving body, a pattern generating plate, a support plate to support the receiving body, and a fixing plate to support the receiving body.

9. A method of manufacturing a coffee bean block, the method comprising:
   a green coffee bean milling operation to remove an outer surface layer of the green coffee bean to produce a milled green coffee bean;
   a milled green coffee bean roasting operation of roasting the milled green coffee bean obtained from the green coffee bean milling operation to produce a roasted milled coffee bean; and
   a roasted coffee bean block making operation of compressing the roasted milled coffee bean obtained from the milled green coffee bean roasting operation to produce a coffee bean block,
   wherein an amount of the outer surface layer that is milled is greater than about 0.01 um in depth so that an amount of acrylamide in coffee from the coffee block of the roasted milled coffee bean is less than about 17.21 µg/kg.

10. The method of claim 9, wherein the green coffee bean milling operation includes:
    a green coffee bean placing operation of placing the green coffee bean in a milling machine; and
    an outer surface layer milling operation of milling the outer surface layer of the green coffee bean.

11. The method of claim 10, wherein, in the outer surface layer milling operation, the green coffee bean is milled for between about 10 seconds to 30 minutes.

12. The method of claim 11, wherein, in the outer surface layer milling operation, the green coffee bean is milled for a total milling time of about 21 minutes in 3 increments, so that a time for each increment is about 7 minutes.

13. The method of claim 9, wherein, in the green coffee bean milling operation, an amount of removal of the outer surface layer of the green coffee bean is between about 0.09 um to 0.11 um in depth.

14. The method of claim 9, wherein, in the green coffee bean milling operation, the amount of removal of the outer surface layer of the green coffee bean is about 1.0 um in depth.

15. The method of claim 9, wherein the milled green coffee bean roasting operation includes:
    a roasted coffee bean placing operation of placing the roasted coffee bean in a bean block mold; and
    a roasted coffee bean pressing operation of pressing the roasted milled coffee bean using the bean block mold.

16. The method of claim 15, wherein, in the roasted coffee bean pressing operation, a volume of the roasted milled coffee bean is reduced by greater than half of an original volume of the roasted milled coffee bean.

17. The method of claim 15, wherein, in the roasted coffee bean pressing operation, when an original volume of the roasted milled coffee bean is V0 and a volume of a compressed coffee bean block is V1, a ratio of V1/V0 is about 0.15 to 0.5.

18. The method of claim 17, wherein the ratio of V1/V0 is about 0.2.

19. The method of claim 9, wherein, in the roasted coffee bean block making operation, the roasted milled coffee bean is compressed at a pressure equal to or greater than about 1500 kg/cm$^2$.

20. The method of claim 9, wherein the coffee bean block includes uneven parts on at least one side thereof.

21. The method of claim 1, wherein an amount of caffeine in the coffee from the compressed coffee block of the roasted milled coffee bean is less than about 133.36 mg/100 g.

22. The method of claim 21, wherein the amount of caffeine in the coffee from the compressed coffee block of the roasted milled coffee bean is about 94.01 mg/100 g.

23. The method of claim 9, wherein an amount of caffeine in the coffee from the compressed coffee block of the roasted milled coffee bean is less than about 133.36 mg/100 g.

24. The method of claim 23, wherein the amount of caffeine in the coffee from the compressed coffee block of the roasted milled coffee bean is about 94.01 mg/100 g.

25. The method of claim 1, wherein the amount of acrylamide in the coffee from the compressed coffee block of the roasted milled coffee bean is about 12.5 μg/kg.

26. The method of claim 9, wherein the amount of acrylamide in the coffee from the coffee block of the roasted milled coffee bean is about 12.5 μg/kg.

* * * * *